Dec. 6, 1966  R. SOLLANEK  3,289,508

DEVICE FOR THE CONTROL OF A MACHINE TOOL

Filed Dec. 7, 1964  3 Sheets-Sheet 1

INVENTOR
RUDOLF SOLLANEK

BY *Wenderoth, Lind & Ponack*

ATTORNEYS

Dec. 6, 1966    R. SOLLANEK    3,289,508
DEVICE FOR THE CONTROL OF A MACHINE TOOL
Filed Dec. 7, 1964    3 Sheets-Sheet 2

INVENTOR
RUDOLF SOLLANEK

BY *Wenderoth, Lind & Ponack*
ATTORNEYS

Dec. 6, 1966    R. SOLLANEK    3,289,508
DEVICE FOR THE CONTROL OF A MACHINE TOOL
Filed Dec. 7, 1964    3 Sheets-Sheet 3

Inventor
Rudolf Sollanek
By
Wenderoth, Lind & Ponack
Attorneys

Header omitted 3,289,508
DEVICE FOR THE CONTROL OF A
MACHINE TOOL
Rudolf Sollanek, Hamburg, Germany, assignor to
F. B. Hatebur, Basel, Switzerland
Filed Dec. 7, 1964, Ser. No. 416,238
Claims priority, application Germany, Dec. 7, 1963,
H 51,078
15 Claims. (Cl. 83—80)

The present invention relates to a method and a device for the control of a machine tool.

For various reasons it may be necessary in machine tools to exclude certain pieces of the material to be machined from subsequent machining operations.

This applies frequently, in particular to the pieces of the material which form the beginning or the end of the machining lengths; the reason for the elimination being, for instance, that such end pieces may be damaged or in other ways do not comply with the quality required.

If the machining speed is not very considerable, it may be sufficient to observe visually the incidence of unsatisfactory or unsuitable end pieces at the front or rear end of the material length and manually to ensure their elimination. In cases, however, where owing to machining speed or for economic reasons it is impracticable to supervise the material and to initiate elimination by an operator, these measures have to be controlled automatically.

It is the aim of the present invention to suggest a method and a device for automatic control of the handling of end pieces of material supplied in lengths to a machine which cuts it into pieces for machining.

One method according to the invention is characterised by having a sensing device, arranged at at least one control point in the path of the material supplied to the machine, and a cutting device for cutting the material into lengths, the arrangement being such that when the rear end of the material passes the control point the sensing device is exposed to an influence which causes the device to impart an impulse to a counter which is adjustable for a first and a second optional number counting range, and may be transferred from a condition of operational readiness to one of counting so that in the counting condition each cutting operation is recorded by the transmission of an impulse from the cutting device to the counter and, after the first number range has been counted, the counter switches over to the second number range and also switches on a control which causes all pieces cut off during that period to be excluded from continuing the machining process, which control is kept switched on during the counting of the second number range, and which it switches off again after counting the second number range, at the same time returning the counter from the counting condition to that of operational readiness.

The invention also comprises an arrangement for applying said method.

A device according to the invention may be applied to a machine having a drive shaft, material feeding members, a cutting device for cutting pieces off the front end of the material lengths successively supplied to the machine, clamping devices which in their original position clamp the separated piece until it reaches the next operational stage, in a modified position, but which cause it to be excluded from subsequent machining, and adjusting members to modify the position of the clamping devices.

Such a device for carrying out a process according to the invention may have at least one sensing device, positioned at a specially provided control point in the path of the material feed and designed to supply an impulse for a counter when the rear end of an advancing material length passes a control point and a counter capable of being set to a first and a second optional number range and of receiving both impulse and counting control signals and of being transferred by an impulse from the sensing device from a condition of operational readiness to one of counting, in which condition it records each counting control signal transmitted from the cutting device at each cutting operation, and after reaching the first number switches to counting the second predetermined number range, simultaneously switching on a control for the machine and maintaining it operated during the period of counting of the second number range, and after completing the count switching off and returning the counter from the counting condition to that of operational readiness.

According to one feature of the present invention there is provided a method for controlling a machine in which an operation is performed on material supplied to the machine which has a control-point in the path of movement of the material, a stop against which the material may abut, a cutting device, a sensing device associated with the control-point, and counter means associated with the sensing device, including the steps of sending a signal from the sensing device to the counter means when the end of a length of the material reaches a predetermined point thereby causing the counter means to be brought into an operative condition sending a signal to the counter means when an operation is performed on the material, counting a given number of the said operations, causing a part of the mechanism of the machine to function when the said given number of operations has been counted, and causing the said part of the mechanism to restore when a further number of operations has been counted.

According to another feature of the present invention there is provided a device for controlling a machine in which an operation is performed on material supplied to the machine which has a drive shaft, means for feeding the material, a cutting device for cutting the material, and clamping means for holding the cut-off material, which device includes a control-point in the path of the material, a sensing device associated with the control-point, counter means connected to an output from the sensing device and arranged to be brought into a state of readiness by a signal from the sensing device, means to connect a signal from the cutting device to the counting means to record the number of cutting operations performed, means associated with the counter to modify the operation of the clamping means when a first given number of cutting operations has been performed and to cause the counting means to count a second given number of cutting operations, and means to restore the operation of the clamping means when the second given number of operations has been counted.

An example of the invention applied to an automatic hot press for producing blanks for nuts is shown in attached drawings and the method and arrangement are described with reference to the accompany drawings which show in:

FIGURE 1 a diagrammatic arrangement of the machine for the production of blanks for nuts in an automatic hot press, in FIGURE 2 a perspective view of the components of the hot press necessary for the method and of a device according to the invention, and in FIGURE 3 an operational diagram of a control for the arrangement illustrated in FIGURE 2.

Figure 1:
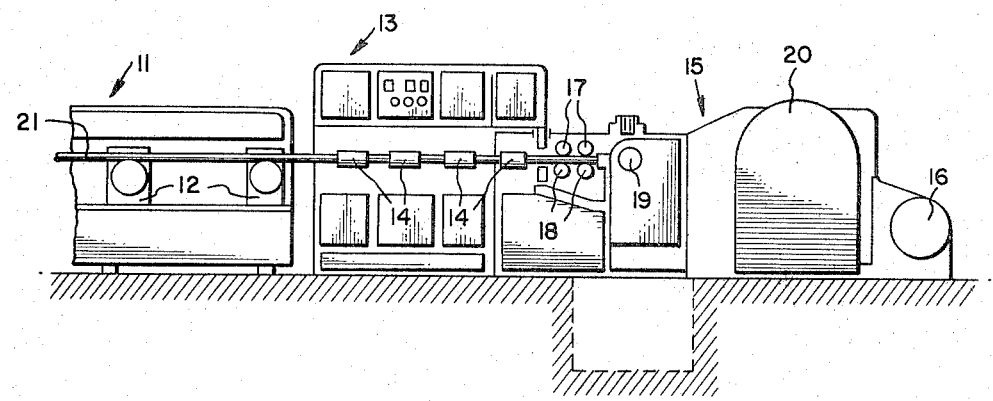

The arrangement consists of a bar magazine 11 for the automatic feeding of bars by means of roller supports 12, a heater 13 with heating elements 14 and a hot press 15 with drive 16, guide- and feed-rollers 17, 18, a device 19 for cutting off pieces from the bars to be machined, and a press block 20 for the forming operations necessary to transform each piece cut off from the bar into the blank of a nut.

The machine operates as follows:

From the bar magazine 11 storing the bars to be machined the bars are fed automatically by means of roller supports 12, one bar 21 after the other being pushed without a gap and at uniform speed through the heating elements 14 of the heater 13 and towards the guide- and feed-rollers 17, 18. The bar, heated by the elements up to forging temperature is moved by the rollers 17, 18 up to a stop 65 (shown only in FIGURE 3) and is held when reaching it, after which a cutting device cuts off a piece 21a from the front end of the bar.

The cut-off piece is transferred from the cutting device to the next machining station at the press block where it is subjected in several forming stations to a forging process transferring it into a blank which is finally ejected by the machine.

After the piece has been cut off, the bar is again advanced by the rollers 17, 18 up to the stop and the cutting device separates another piece.

The continuous feed of bars to the hot press and the intermittent advance of the bar gripped by the rollers 17, 18 are synchronized in such a way that both have the same mean speed, i.e. the intermittently moved bar is advanced at higher speed than the continuously moving bars. The front end of the continuously moving bar is moved towards the rear end of the preceding intermittently moving bars during its stopping period so that the front end of the continuously moving bar just contacts the rear end of the intermittently moving bar when the latter advances again by the length of the cut-off piece.

The advance of the bar to be machined and the cutting off of the piece from the front end of the stationary bar is continuously repeated and forms the operational cycle of the machine, followed also by the remaining operational stations at the press block of the hot press.

As soon as the bar which is being machined has become so short that the following bar is gripped by the rollers 17, 18, this bar is now advanced by the rollers 17, 18 through the second bar being in permanent contact with the preceding one.

The purpose of the method and the arrangement described here is to exclude certain pieces of the material after separation from the bar, from the subsequent operations for making nuts.

As a controlling distance for the exclusion of the material the distance from the control point to the cutting device is used, whereby the passage of the end of a bar is recorded, and after "$n$" cuts, "$n$" depending on the distance between control point and cutting point and on the variable cutting length between cutting plane and stop, a certain number of "$x$" pieces is taken out of the sequence of operations.

At the cutting point pieces of a certain length are cut off. Since it is important, owing to high pressures and in order to avoid accidents, to supply the stations of the press block always with the correct volume, pieces which do not accurately comply with this requirement have to be withdrawn. These are, in particular, the front and rear ends of the bar.

For certain reasons, the control point described later on is arranged at the entry of the bars into the hot press and the controlling distance is relatively short. Since blanks for nuts of various size are to be produced in the hot press, the length of the cut pieces varies. For this reason, the method and arrangement is designed to permit the adjustment of the number of cuts after which the pieces are to be rejected. At the same time, the number of successively rejected pieces can also be adjusted.

Figure 2:
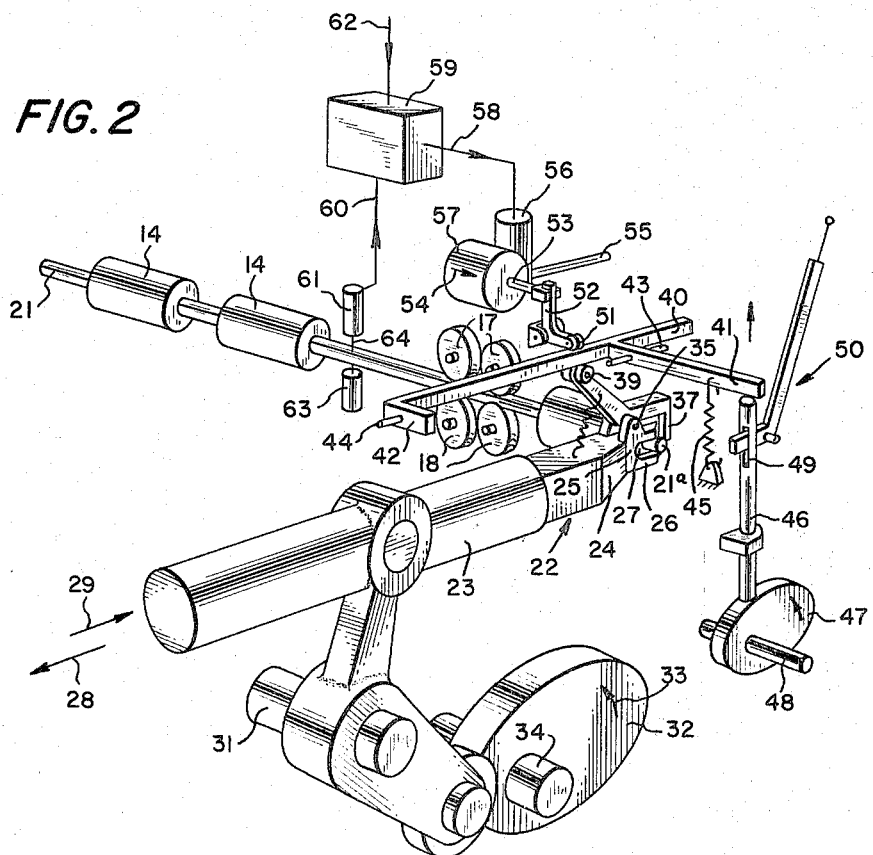

FIGURE 2 shows in a perspective view the part of the hot press comprising the controlling distance. In FIGURE 2 there is seen a bar 21 with its part towards the left of the figure extending through the heating elements 14 and with its part towards the right of the figure between the guide- and feed-rollers 17, 18 extending to the cutting device 22.

The cutting device 22 consists of a cutter slide 23 having at its reduced end 24 a shear head 25. The shear head has at its free end a slot 26, open towards the front, through which, in FIGURE 2, is visible the shear blade 27 attached to the back of the shear head. The cutter slide is movable in the direction of arrows 28, 29. In order to move the cutter slide in the direction of arrow 29, a two-armed lever 30 is attached to slide 23, rotating on a shaft 31 and set in motion by a cam 32 contacting its free end. Consequently, rotation of cam 32 on shaft 34 in the direction of arrow 33 causes the slide 23 to move in the direction of arrow 29. To move the slide in the direction of arrow 28, a second cam, not shown, may be provided in addition to cam 32, rotating the lever on its shaft 31 in anti-clockwise direction, or on an extension of the slide to the left may be arranged a device keeping the slide permanently under tension in the direction of arrow 28.

The shear head has two lugs 35 which rotatably support a two-armed lever 36. The downward pointing end of one arm of lever 36 contacts the material bar 21 which protrudes into the cutting device. Between the other, upper end of lever 36 and the front end 24 of the slide 23 is positioned a pressure spring 38 which ensures the bent end 37 of the lever being pressed against the end of the material bar 21. The upper end of lever 36 carries rollers 39, contacting the shift rail 40 which is supported by two parallel levers 41, 42 arranged at right angles to the shift rail. The levers 41, 42 rotate on two pins 43, 44 with common axis, moving the shift rail up and down round the axis of pins 43, 44. To the free end of lever 41 is attached a spring 45, fastened with the other end to the frame of the machine and pulling the free end of lever 41 against the top end of bar 46. Bar 41 is a control rod which can be moved up and down by means of a cam 47 attached to shaft 48.

The control bar 46 has a slot 49 engaging the end of a double-armed lever 50. With this lever 50 the control bar 46 can be lifted by manually depressing the long lever arm and, consequently, the shift rail 40 lowered. Since the shift rail 40 operates the lever 36, the bent end 37 of lever 36 can be lifted from the bar 21 by depressing the long arm of lever 50 or by the cam lifting the control bar 46.

On the shift rail 40 rests a roller 51 which is attached to the arm of a double-armed lever 52, fastened to the machine frame, the other arm of which is connected through a piston rod 53 with a piston, not shown, in a cylinder 54. The cylinder 54 is attached to the machine frame and supplied with compressed air from a pipe 55.

The pipe for compressed air 55 passes through an electromagnetic valve 56 which, when open, supplies compressed air to the left end of cylinder 54 in FIGURE 2, moving the piston in the direction of arrow 57 and pushing the shift rail 40 down by means of roller 51 and keeping it there. If valve 56 is not actuated, the compressed air is supplied to the right end of the cylinder and the piston is moved to the left until lever 52 takes up the position shown in FIGURE 2 in which the shift rail is not pressed down. The valve 56 is connected by a link 58 with a counter 59.

The counter 59 is connected by a wire 60 with at least one sensing device 61 and can be adjusted for alternative number ranges. It is designed to be switched to counting position by an impulse from the device 61. Counter 59, in addition, is connected by a wire link 62 with an impulse transmitter, not shown, actuated by the cutting device 22 or by a drive member of the cutting device, for instance the lever 30, the cam 33 or the shaft 34. The impulse transmitter, for instance, may consist of a contact switch which is closed temporarily once at each cut by the drive member or the cutting device, thus transmitting a counting impulse through wire 62 to the counter 59.

In FIGURE 2 is arranged opposite the device 61 on the other side of the passing bar 21 at least one radiant source 63. This radiant source is designed to send a small directed ray in the direction of the device 61, thus crossing the path of the advancing bars. This crossing forms the control point 64. If a bar is present at the control-point 64 the ray hits the bar. If there is no bar or after the rear end of the bar has passed the control-point the device 61 is hit and transmits an impulse to counter 59.

The source of radiation may be any source different in character and intensity from the radiation of a hot bar, in particular a source of visible or invisible light like, for instance, ultraviolet rays. The sensing device has to be selected in accordance with the radiation. For visible light, for instance, the device may be a selenium cell.

Also the radiation from the heated bars themselves may be utilized to produce the mipulse in the device 61. In this case the device 61 is arranged so as to send an impulse through wire 60 when the radiation from the bar hitting the device ceases.

To ensure registration of the passing of an end of a bar it may be advisable to provide more than one feeler and control-point in order to avoid failures in case a single feeler breaks down.

For instance, when using the hot bar as a source of radiation it may occur that the end of the bar, gripped by the entry rollers, after the initial advance stops immediately at the control-point of the one sensing device. The device consequently is still exposed to the radiation from the end of the bar. Since the mean speeds of material feed by the roller supports and the material entry through the guide- and feed-rollers are equal, the front end of the following bar has reached the rear end of the preceding bar when the latter leaves the control-point at the next intermittent advance, consequently the front end of the following bar influences the sensing device by emitting radiation, the latter, therefore, does not transmit an impulse although a bar end passes by. Even screening the radiation of the hot bar in such a way that only rays emitted at right angles to the bar axis reaches the sensing device is not sufficient to ensure transmission of an impulse.

Figure 5:
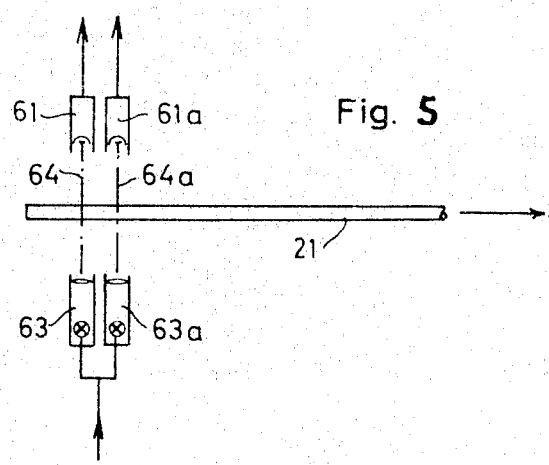
FIGURE 5 illustrates diagrammatically a further modified form wherein two sensing devices are used.

In such cases, two sensing devices and two control points are provided, arranged one after the other in the direction of the advancing bars as shown in FIGURE 5. The distance between the control points should be made small and may be adjustable. The adjusted distance should be shorter than the length of the cut-off piece of bar. In FIGURE 5 a modification is shown wherein two sensing devices 61 and 61a are used. A second control point is shown at 64a and a second radiant source is indicated at 63a.

In FIGURE 2 the control point is arranged by placing the source of radiation 63 below, and the sensing device 61 above the bar which passes between them. In practice, it is advisable to position neither of the two elements below the hot bar since this, owing to cooling by the surrounding air and through the jerking movement, may cause to drop and cover the element located below the bar, blocking the path of radiation and causing failures.

The control impulse produced in the sensing device is transmitted, as described above and demonstrated in FIGURE 2, through the link 60 to the counter 59 which is connected to impulse link 62 and control link 58.

Figure 3:
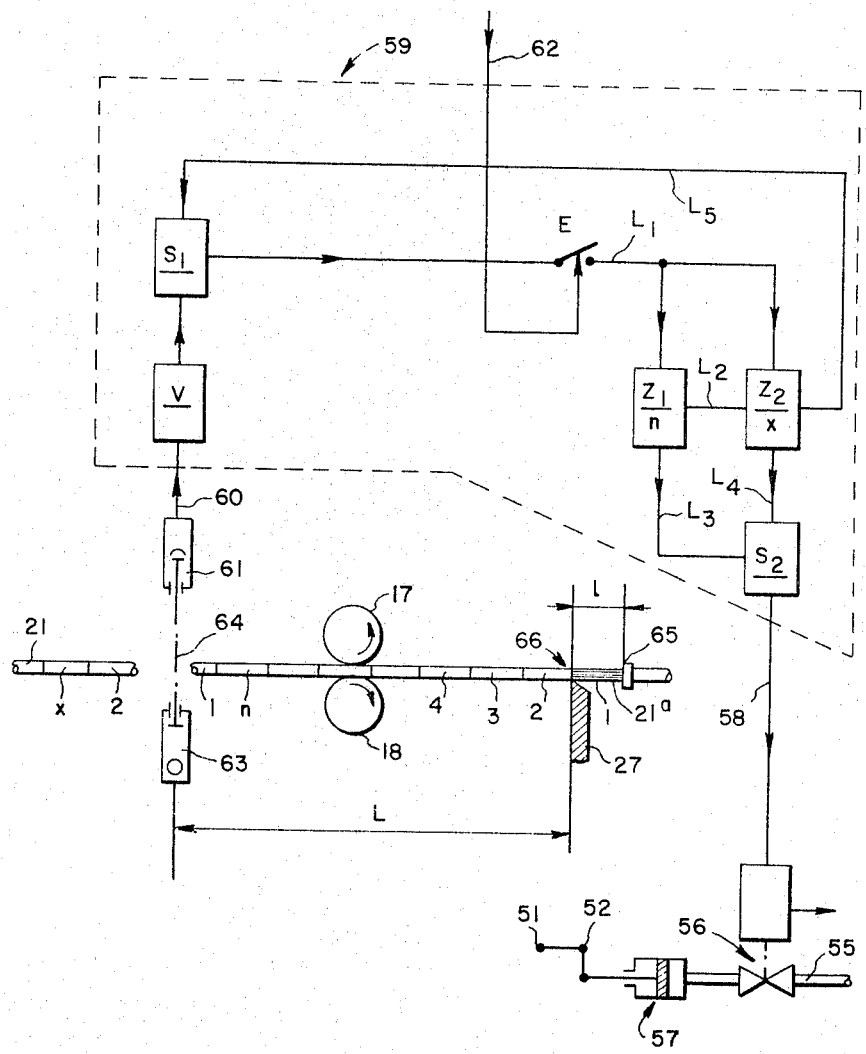

FIGURE 3 shows in diagrammatic form an example of the wiring of such a counter 59. The impulse coming from the sensing device 61 is transmitted through an amplifier V to a contactor S1 which is switched on and remains so. The contactor S1 is connected by a cable L1 and a switch E with two counters Z1 and Z2 arranged in parallel, on which are adjusted the selected numbers "$n$" ($n$=number of pieces cut off by the cutting device to be supplied to the press) and "$x$" ($x$= number of pieces which are to be excluded from subsequent operations). The switch E may be operated mechanically and represents the above-mentioned impulse transmitter for the counter. In this case, 62' in the drawing represents the mechanical operator of the impulse transmitter. Switch E may alternatively be operated electrically, and be switched on for the duration of an impulse transmitted through wire 62 (FIGURE 2), whereby link 62' corresponds with link 62 in FIGURE 2. The counters Z1 and Z2 may be of any design, for instance electromagnetic or electronic counters. Both counters are wired up in such a way that counter Z1 after the contactor S1 is switched on, counts every impulse passing through switch E from a source not shown, through wire L1 until the number $n$ is reached and the counter Z2 is switched to counting position through wire L2.

Now counter Z2 counts until the number $x$ is reached and switches contactor S1 off again through wire L5, both counters Z1 and Z2 are now being returned to the original position.

In FIGURE 3 the counters Z1 and Z2 are connected through wires L3 and L4 with a contactor S2 which is linked to wire 58 in order to operate valve 56. It is switched on by counter Z1 after reaching the number $n$ through the wire L3 and so maintained, and switched off by counter Z2 after reaching the number $x$ through the wire L4. While the contactor S2 is switched on, i.e. for the period the counter Z2 counts up to $x$, the valve 56 is turned on and remains so, causing the pieces cut off during this period to be excluded from the subsequent press operations.

After counter Z2 has reached the number $x$ it returns the contactors S1 and S2 to the initial position, and the entire counting mechanism is returned to the initial position of readiness until an impulse from sensing device 61 brings it back to counting position.

If the impulse from the feeler is sufficiently strong to switch the contactor S1, the amplifier before the counter may be dispensed with. This applies whenever the sensing device is wired up in a way to supply sufficient energy to link 60.

In place of two separate counters Z1 and Z2 one single counter with two counting ranges may be used which automatically switches from the first counting number $n$ to the second counting number $x$ and which has the necessary connections for the contactor S2 and for the return of the counter to the initial position.

Regarding the rollers 17, 18, it may be mentioned that the roller 17 is an idling roller which is pressed down either to the lower rollers or to the bar 21 by means not shown. The lower rollers are intermittently rotated through a drive not shown.

The sensing device may comprise a light sensitive electric resistance responsive to radiation and wired in a way to produce an impulse for the counter at the start of the radiation from a separate source, or in the absence of radiation from the bar heated up to forging temperature. The sensing device may comprise a photoelectric cell.

Finally, a mechanical device may be used as a sensing device and at its free end it may carry a sensing pin, designed to contact a bar 21 at the control point if a bar is present, or if the bar is missing, to take up a position in which sensing device 61 keeps an electric switch, not shown, closed which when the end of a bar passes the control point switches counter 59 to counting position.

Figure 6:
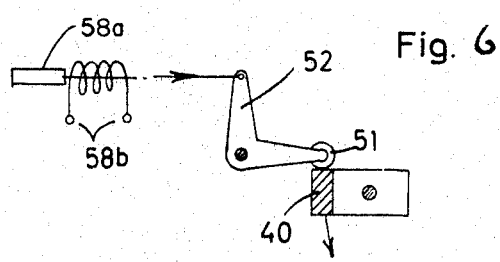
FIGURE 6 illustrates a further modified form.

In place of the combination of valve 56 and cylinder 54 with piston, not shown, there may be used an electromagnet operated by the single or the second counter as the case may be. As shown in FIGURE 6 there is provided in this arrangement a two-armed lever 52, one arm of which rests on the shift rail 40 as shown in the arrangement of FIGURE 2, whilst the end of the other arm is attached to the armature 58a of an electromagnet having a coil 58b, causing the second lever arm to be lifted when the magnet is switched on and attracting the armature, thus pressing down roller 51 and the shift rail 40.

The control device 56, 57 may be designed to use for operating the piston in cylinder 57 a liquid under pressure, for instance oil, instead of compressed air. For the return of the counter a press button may be provided, enabling the return to be effected at any time by hand which otherwise is initiated by counter Z2 after having reached the number x.

Instead of a press button, or in parallel with it, a sensing device with the same control point 64 may be provided which transmits a return impulse when the end of a bar passes, like the counter Z2 does after having reached the number x. For hot presses this sensing device may be an optical element, transmitting the return impulse after the end of a hot bar has passed and after the hot bar has cooled down to a temperature too low for the operation in a hot press. The counter may, for instance, with reference to hot presses, be wired in a way to return automatically to the initial position in the case of a failure. This return device can also be combined with the sensing device 61 which switches to counting position, when using a mechanical sensing device, in order to initiate both measures by the moving element. When, however, using a sensing device sensitive to radiation, there may be used in order to effect both measures, i.e. the return from counting position to that of readiness and vice versa, two independent sensing devices hit by the same ray or by a single sensing device.

Instead of transferring the counter to readiness when switching on the press and the counter, a sensing device may be provided with a control point at a point on the path of the bar between the entry rollers and the cutting device, which switches the counter to readiness only when a bar is present at the control point. In hot presses this sensing device is preferably an optical element, influenced by a hot bar and switching the counter off not only when a bar is absent but also when the bar is too cool.

The method described here, for automatic control of the exclusion of certain pieces cut off a bar from subsequent machining, results from the cooperation of the above-described part of the hot press with the members of the control arrangement in accordance with the method of operation explained before.

When in operation, one bar after another is supplied to the hot press by the roller supports 12 at uniform speed, the bars follow each other without gap. A bar, having reached the entry to rollers 17, 18 is gripped and pushed intermittently at greater speed against a stop 65, positioned behind the cutting point 66 and shown in FIGURE 3, which determines the length of the cut-off piece of material 21a, i.e. the distance between cutting point and the stop.

The cutting device 22, moved by the drive mechanism of the machine in the direction of arrow 29, shears from the bar the material length 21a against a stationary shearing blade, positioned opposite blade 27 and not shown. The cut-off piece 21a is pressed by the end 37 of lever 36, acting as a retaining claw, into the slot 26 of the cutting head against shear blade 27 and is so held by the cutting device 22. The cutting device moves further to the right in FIGURE 2, beyond the position where the piece was separated, whereby the rollers 39 of lever 36 run along the shift rail 40. After reaching the point where the cutting device has to transfer the piece it carries to the next operation, the cam 47 lifts through the control rod 46 the lever 41, shift rail 40 operates lever 36, and the claw 37 is lifted from the cut-off piece which is released.

Now the cutting device 22 moves to the left again to its original position in FIGURE 2, after which the bar 21 is again pushed forward up to the stop 65. In this way, one operational cycle of the cutting device has been completed and it is subsequently continuously repeated.

When the bar 21, intermittently advanced by the rollers 17, 18, passes with its rear end the control point 64, an impulse is produced in the sensing device 61, caused by emission of a ray or by the absence of radiation from the bar heated up to forging temperature, which is transmitted through the wire 60 to counter 59.

Through this impulse the counter which at the start was in a condition of readiness is switched to one of counting and receives through the wire 62 a counting impulse from the shear movement of the cutting device 22 for each cutting operation by means of impulse senders, for instance by a switch operated by the cutting device.

As a counter a device is used which can be adjusted for a first selected number n and for a second selected number x, the range of the first and second numbers corresponding with the possible values of n and x. At the reception of counting impulses from the transmitting devices, the counter counts up to the first number n, whereby the cut-off pieces are transferred to the next machining operation. The release of the cut-off piece held by lever 36 with the claw 37 is secured by the claw being moved by cam 47 through control rod 46, lever 41 and shift rail 40.

After reaching the first number n the counter 59 actuates the control device 56, 57, thus lifting the lever 36 through lever 52 and shift rail 40 with its end 37 against the tension of a spring 38 into an ineffective position. The claw 37 remains in this position as long as the control device is actuated. During this operation the counter is simultaneously switched over to counting for the second number x and actuates during this period the control device 56, 57, i.e. the claw 37 is held up during the period of counting for the second number x. As long, however, as the claw is held in ineffective position each piece after being cut off drops off the cutting device 22 and is not transferred to the next operation.

After having reached the second number x, the counter 59 returns from counting position to that of readiness and switches off the control device 56, 57. Consequently, all the following pieces cut off from a new bar are passed on to subsequent operations. Only at a new impulse from the sensing device the operational cycle of counter 59, as just described, starts again.

According to the wiring of the counter, it is with the method described possible after a break in operation to continue counting automatically with the counter operating as before the break or, alternatively, to return it to the position of readiness. The method may also be modified in such a way that before starting to count always a return impulse is applied to the counter, irrespective of same being already returned or not. Sensing device 61, in particular, may be utilized to transmit such a return impulse.

Figure 4:
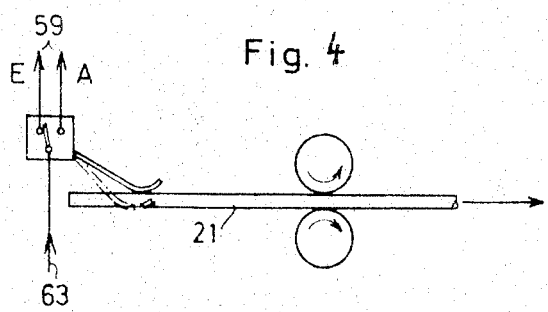
FIGURE 4 shows diagrammatically a modified form of the sensing device.

E and A in FIG. 4 are abbreviations for two conductors, one of which, cable E, may operate the wiring of the counting mechanism into the position of readiness or may be missing when the wiring is being put into the position of readiness at the time of beginning of operation of the arrangement as described in the description of the invention. The conductor A serves to switch the counting mechanism into the counting position in the manner described above when a bar end passes the control point surveyed by the sensing device.

As recording means in the method described above there can also be employed at the control points ultrasonic waves, whereby in the arrangement explained before a source 63 for ultra-sonic waves may be arranged as shown in FIGURE 2 in such a manner that the ultrasonic wave is directed by the control point 64 towards the sensing device 61, sensitive to ultra-sonic waves.

I claim:
1. A device for controlling a machine in which an operation is performed on material supplied to the machine which has a drive shaft, means for feeding the material, a cutting device for cutting the material, and clamping means for holding the cut-off material, which device includes a control-point in the path of the material, a sensing device associated with the control-point, counter means connected to an output from the sensing device and arranged to be brought into a state of readiness by a signal from the sensing device, means to connect a signal from the cutting device to the counting means to record the number of cutting operations performed, means associated with the counter to modify the operation of the clamping means when a first given number of cutting operations has been performed and to cause the counting means to count a second given number of cutting operations, and means to restore the operation of the clamping means when the second given number of operations has been counted.

2. A device as claimed in claim 1, in which the sensing device is a light sensitive device arranged to transmit a signal to the counter either when it receives a radiation or when radiation received by it ceases.

3. A device as claimed in claim 2, in which the light sensitive device is a photo-electric cell.

4. A device as claimed in claim 1, in which the sensing device is a mechanical feeler having at one end a sensing pin designed either to rest on the material, or, in the absence of the material, to move into a position in which an electric circuit is closed thereby bringing the counter into the counting position.

5. A device as claimed in claim 1, in which the means to modify the operation of the counting means is an electromagnetic device.

6. A device as claimed in claim 1, in which two sensing devices are provided along the path of the material at a distance apart less than the lengths of the pieces of material cut by the cutting device.

7. A device as claimed in claim 1, in which the sensing device is sensitive to ultra-sonic vibrations and a source of the said vibrations is provided on the opposite side of the path from the sensing device.

8. A device for controlling a machine in which an operation is performed on a rod supplied to the machine comprising a drive shaft, means for feeding said rod, a cutting device for cutting said rod, a control mechanism, holding means provided with a displacing device, said holding means fixedly holding cut off individual pieces from said rod until they are delivered to the next working station, said displacing device displacing cut lengths from said rod from further working, a sensing device, a counter mechanism, an abutment cooperating with an end of said rod, the adjustable distance of said sensing device from said abutment being more than a multiple of the cut off length from said rod, said sensing device being so constructed that when the rear end of a forwardly moving rod passes by an impulse is transmitted to said counter mechanism which is adjustable to a first and to a second selective number value and works on said counter mechanism so that said counter mechanism is brought by the impulse of said sensing device from the position of operation into the counting position, and which in counting position counts every impulse transmitted to it by a cut-off operation from said cutting means, which shifts when the first number value is reached to counting a second number value, and then when the second number value is reached shifts to operating condition, the impulses between said first and second number value holding said holding means in displaced position by means of said control mechanism whereby cut-off individual pieces are separated.

9. A device as set forth in claim 8 comprising two counter mechanisms of which the first counter is adjustable to a first numeral value and the second counter mechanism is adjustable to a second numeral value and the second counter mechanism counts the second value when the first counter mechanism has reached the first number value, said second counter mechanism operating said control mechanism.

10. A device according to claim 8 wherein said sensing device has a light sensitive resistance which gives off an impulse for said counter mechanism upon the beginning or the termination of the ray action.

11. A device according to claim 8 wherein said sensing device is constructed as a photocell.

12. A device according to claim 8 wherein said sensing device is constructed as a mechanical sensing device which is provided with a sensing rod which contacts the rod but which, upon passage of a rod end, assumes a position in which said counter mechanism shifts to counting position.

13. A device according to claim 8 wherein said sensing device comprises an electromagnetic control mechanism.

14. A device according to claim 8 wherein two sensing devices are provided successively positioned so that the distance therebetween is smaller than the desired cut-off length of rod.

15. A device according to claim 8 wherein said sensing device is constructed in the form of an ultrasonic feeler.

No references cited.

WILLIAM S. LAWSON, *Primary Examiner.*